(No Model.)

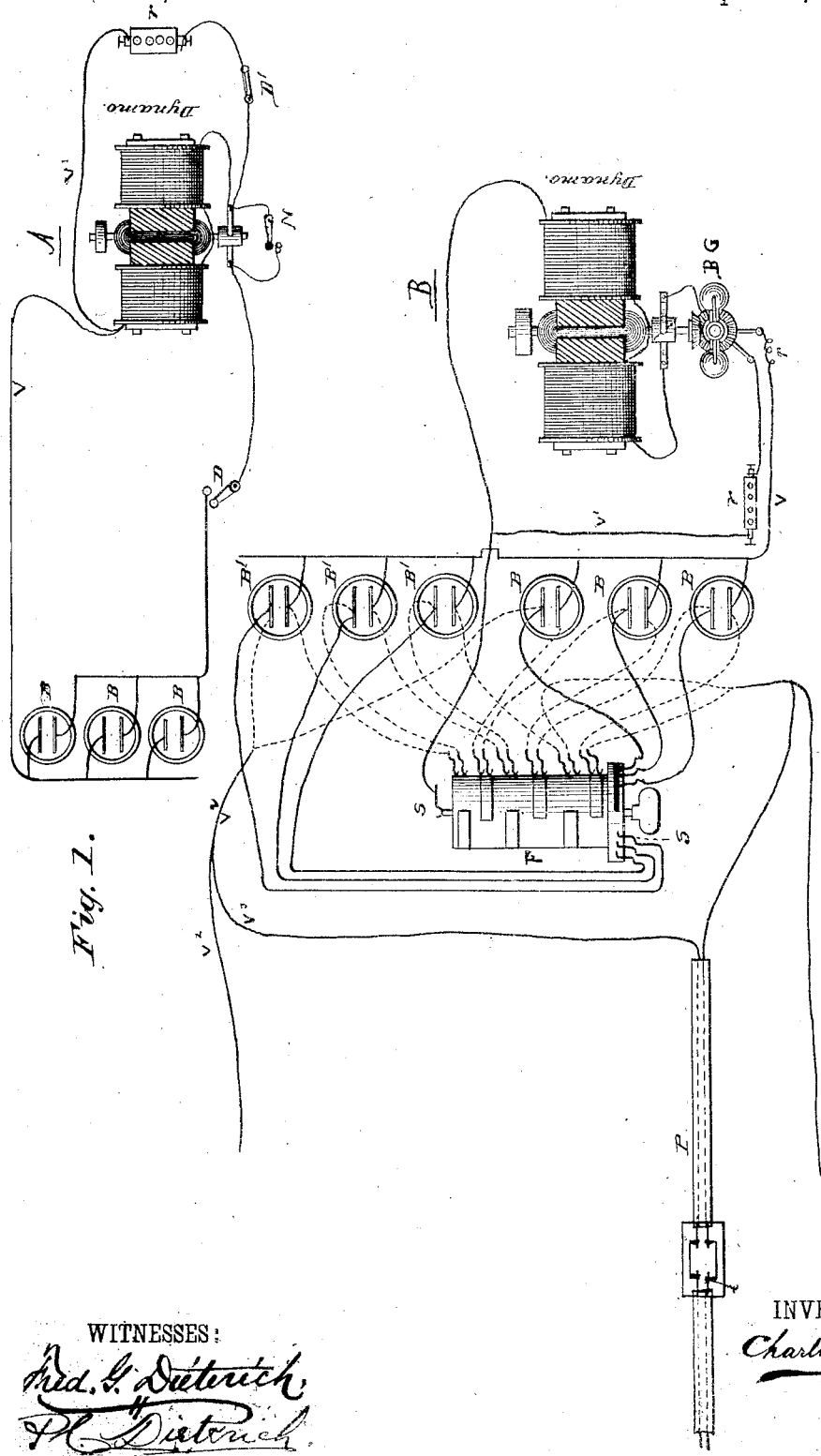

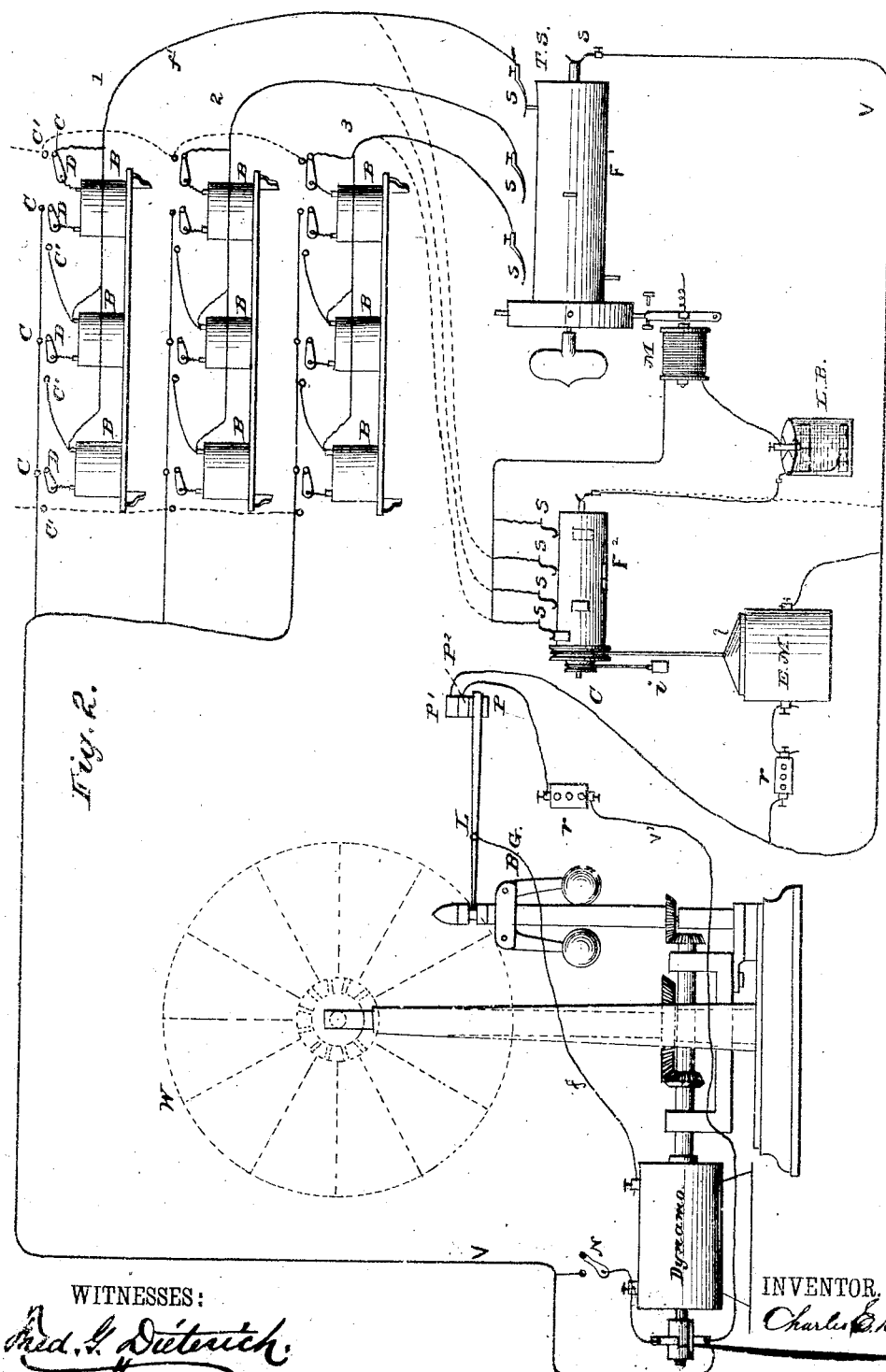

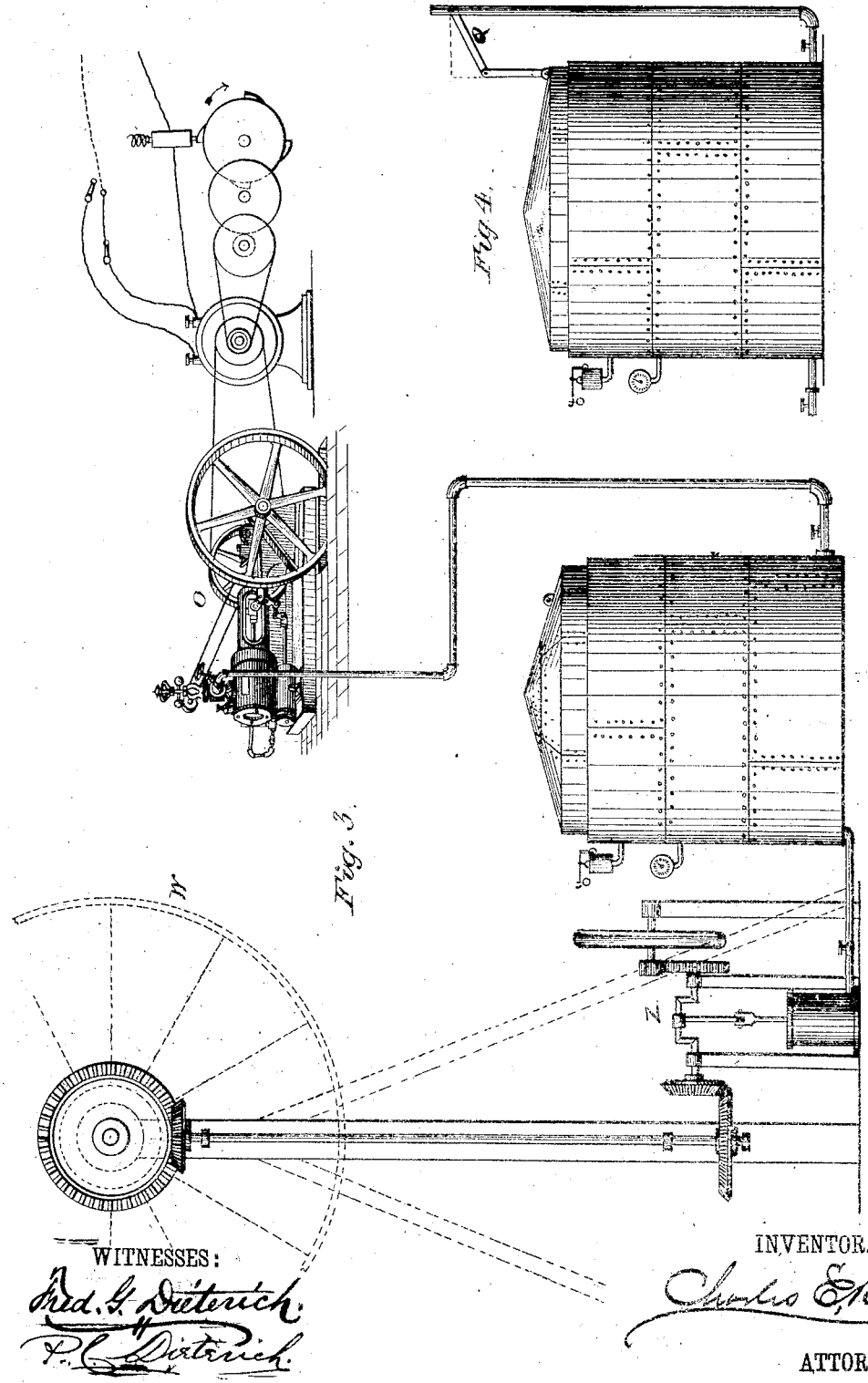

C. E. BUELL.
DEVICE FOR CHARGING AND DISCHARGING SECONDARY BATTERIES.

No. 256,450. Patented Apr. 11, 1882.

WITNESSES:

INVENTOR.

ATTORNEYS.

(No Model.)

C. E. BUELL.
DEVICE FOR CHARGING AND DISCHARGING SECONDARY BATTERIES.

No. 256,450. Patented Apr. 11, 1882.

WITNESSES:

INVENTOR.

ATTORNEYS.

UNITED STATES PATENT OFFICE.

CHARLES E. BUELL, OF NEW HAVEN, CONNECTICUT.

DEVICE FOR CHARGING AND DISCHARGING SECONDARY BATTERIES.

SPECIFICATION forming part of Letters Patent No. 256,450, dated April 11, 1882.

Application filed March 4, 1882. (No model.)

*To all whom it may concern:*

Be it known that I, CHARLES E. BUELL, of the city and county of New Haven, State of Connecticut, have invented Improvements in the Mode of and Devices for Charging and Discharging Secondary Batteries, of which the following is a specification.

My invention relates to the combination of a dynamo-electrical machine, a developing-circuit, and a charging-circuit, which includes a series of secondary batteries in multiple arc, and means included in the developing-circuit and in the charging-circuit for controlling each circuit separately to facilitate starting the machine before charging the field-of-force magnets, then charging the field-of-force magnets before including them in the charging-circuit, then to include the machine in the charging-circuit with the secondary batteries arranged to present the least current opposed to the current from the dynamo-machine, and finally to open the developing-circuit and leave the charging-circuit unbroken.

My invention also relates to automatic devices for introducing a dynamo-electric machine first into a developing circuit and then into a charging-circuit, which includes two or more secondary batteries in multiple arc, or arranged to be interposed successively to offer but slight resistance to the establishment of the charging-currents, and finally to interrupt the developing-circuit and leave the charging-circuit unbroken.

My invention consists in the combination, with a dynamo-electric machine, of devices for automatically interposing the said machine charged into a charging-circuit including secondary batteries, and for withdrawing it from such circuit when its speed falls below a predetermined velocity with switch devices connecting between the dynamo-electric machine and the batteries to be charged, and adapted to successively introduce each group of a series of groups of secondary batteries into the charging-circuit in multiple arc after a predetermined flow of current has taken place in the charging-circuit.

My invention further consists in the combination, with an electrical generating-machine, of an initial propelling-power that acts at irregular periods to propel said electrical generating-machine, and devices for allowing the machine to start without circuit, and to act automatically to place the machine in a developing-circuit, then in a charging circuit, which includes secondary batteries, and finally to open the developing-circuit and leave the charging-circuit unbroken, and, as the propelling-power becomes reduced and the speed of the generating-machine decreases below a predetermined velocity, to reverse the operation and withdraw the machine from the charging-circuit and leave it open, so as to prevent waste of the secondary batteries which have been partially charged.

My invention further consists in the combination, with an electrical generating-machine, of an initial propelling-power that acts irregularly to fill an air-holder with compressed air or a tank with water, and by this intermediate source of power to propel the dynamo or electrical generating machine rapidly for a brief period or constantly at a less consumption of power, and to combine means for automatically introducing and withdrawing the machine into and from the charging-circuit, including secondary batteries by predetermined velocities of said machine, by such means and in such a manner as to avoid back flow of currents from the secondary batteries and waste from the partially-charged secondary batteries, and by the use of such intermediate storage and economy of power and electric currents as to produce a constant source of electrical supply in a working circuit or circuits from a heretofore unavailable waste power, and to accomplish this economy in generating a constant electrical supply without attendance to perform the required manipulations.

My invention still further consists in certain novel combinations and sub-combinations, which will be more fully described and set forth in the following description and claims.

In the accompanying drawings the letters and figures represent corresponding parts in each.

Figure 1 is a plan view of a dynamo-electric machine, developing and charging circuits, and secondary batteries arranged according to my invention. Fig. 2 is an elevation of the dynamo-machine propelled by a wind-wheel, with automatic switch for controlling the developing-circuit and charging-circuit, intermediate switches made operative by electrolytic action, and magnets and secondary batteries, all arranged according to my invention. Fig. 3 is an elevation of a wind-wheel connected to and propelling an air-compressing pump, which by its action fills the expansible air-holder under pressure for propelling the dynamo-machine through the intermediate propulsion of the engine connected therewith, the whole arranged and operating to charge secondary batteries in accordance with my invention. Fig. 4 is a view of the air-holder and automatic devices for turning the air under pressure from the air-holder to the engine at a predetermined degree of charge in the air-holder. Fig. 5 is a view of an air-compressing apparatus propelled by a tide-wheel and giving motion to a remote motor which drives a dynamo to charge secondary batteries according to my invention. Fig. 6 is a view of a wind-wheel actuating a pump which fills a tank, which at predetermined depth overflows by a siphon and propels a dynamo-electric generator through the intermediate action of a water-wheel, the switching devices being controlled directly from the motor to facilitate charging secondary batteries according to my invention. Fig. 7 represents a dynamo-electric machine propelled by a water-wheel in a stream, and arranged to charge secondary batteries in accordance with my invention, the currents from the secondary batteries being conveyed to the remote point by means of a cable to be used or recharge other secondary batteries to get constant currents.

In Fig. 1, diagram A represents a dynamo-electric machine with a charging-circuit, V, and a developing-circuit, V', with secondary batteries B B B interposed in the charging-circuit in multiple arc. After the dynamo or electrical generating machine has been started and attained to a desired speed with the developing-circuit closed, the charging-circuit should be closed by the switch D and the developing-circuit opened by the switch D'. The batteries B B B being in multiple arc in the charging-circuit, and the current from the machine being fully established at the time it is introduced into the circuit with the batteries, I fully avoid the neutralizing effects due to back flow, which are observable when the field-of-force magnets of a dynamo-machine are included uncharged in a circuit with partly-charged secondary batteries. An adjustable resistance, r, is of advantage in a developing-circuit, and especially so when electrical generating-machines with a developing-circuit constantly closed through the helices of the field-of-force magnets, and acting independent of an exterior charging-circuit, which includes the helix of the armature and the batteries, are employed. A short circuit, including the switch N, is desirable to cut down the current in the exterior charging-circuit before opening it at any time during motion of the machine to prevent heavy sparks at contacts of switch D.

In diagram B, Fig. 1, the ball-governor B G is shown in plan view. This is arranged to automatically introduce the dynamo charged into the closed charging-circuit when the machine has reached a predetermined speed, and is fully described in its operation in application No. 50,028, bearing date January 13, 1882. It is shown in combination with two series of secondary batteries, B B B and B' B' B', together with the automatic switch apparatus F, which automatically and at predetermined intervals places the said batteries alternately in the charging-circuit and in the working-circuit $V^2$, to be discharged in tension series, and is fully described in my application No. 48,881, bearing date December 28, 1881. The working-circuit is shown divided into the circuits $V^2$ and $V^3$, the circuit-wire $V^3$ being insulated and contained in a pipe, P, with a metallic return-circuit. The automatic switch F may be adapted to charge each pair of plates successively or all of them at once in multiple arc, preferably the former-named way, when electrical generating-machines of low energy are employed, and waste of charge from back flow and counter flow is thereby avoided or lessened.

Fig. 2 represents a dynamo-electric machine geared to a wind-wheel, W, and having an automatic switch, which is controlled by the speed of the wind-wheel through the action of the ball-governor B G and lever L. A developing-circuit, V', is completed over wire $f$, lever L, plate $P^2$, and return-circuit, including adjustable resistance $r$. An increase of speed acts to place the lever L in contact with plate P' before wholly breaking contact with plate $P^2$, and thus splitting the circuit of the machine momentarily, and then breaking the developing-circuit and leaving the machine included in the closed charging-circuit with the secondary batteries B B B, the charging-currents of the machine being greater at the moment of being turned into the batteries than when normally charging the batteries, because of the double circuit afforded at the instant prior to opening the developing-circuit. As it requires more power to start a dynamo-electric machine on a closed circuit, it is desirable to start it on an open circuit; but as it requires an appreciable period of time to charge the field-of-force magnets when the circuit of the machine is closed after it has attained to its speed, and as the secondary batteries to be charged are usually partially charged after their first using, and will act instantly to charge the field-of-force magnets in the wrong direction and at the expense of their residuary charge, if the machine is introduced into the charging-circuit before being highly charged, the foregoing-described modes of introducing the machine charged into the charging-circuit are advantageous. The manner of arranging the batteries to be charged successively or in multiple arc has the advantage of offering the least resistance to the machine-current, and admits of employing a small power to charge a large battery, a generating-machine of quantity producing a current of sufficient energy to charge one secondary element being available to charge successively a battery which in tension series by its discharge gives the energy of a very much more powerful dynamo. Although there is a percentage of loss of power in converting the current of the machine into a working-current of a secondary battery, it is small, and is sufficiently better in its action to repay the small percentage of loss, while in many instances it is available as the utilized power of the wind, tides, and moving trains, and if it required one horse-power of the initial power to afford the equivalent of one-half a horse-power in the secondary effects it would in those instances cited have cost only the outlay for apparatus.

In Fig. 2 there is shown a rotary switch, $F^2$, and contacts S S S, arranged to open and close the circuit of the local battery L B, which includes the electro-magnet M, the armature of which acts as an escapement to the rotary switch $F'$, which is actuated by a concealed clock mechanism, and which successively interposes the series 1, 2, and 3 of secondary batteries in the charging-circuit in multiple arc by its revolutions. The rotary switch $F^2$ is actuated by the counterpoise-weight $i$ and the weight of the expansible gas-holder $l$ of the electrolytic cell E M. The action of a diverted portion of the charging-current, decomposing the liquid contents of the cell, fills the holder with gas, which causes it to be raised by the pressure of gas and weight $i$ rotating the switch $F^2$. The contacts S S S may connect by wires, as shown in dotted lines, direct with the secondary batteries without the intervention of the switch $F'$ and local circuit. By this combination of devices the irregular power of the wind-wheel W is converted into a constant power without attendance, for through the automatic action of the lever L the electrical generating-machine is withdrawn from the charging-circuit when the speed falls below normal, and is interposed in the charging-circuit again when a desired speed is attained, thereby always giving an effective charging-current when in circuit with the secondary batteries, and the rotary switch $F^2$ withdraws a series of secondary batteries from the charging-circuit after it has received a predetermined flow of current and interposes another series to become charged.

The secondary batteries described in the charging-circuit are shown disconnected to better show the contacts C C C C' C' C' and switches D D D. When the switches D D D are turned into contact with the points C C C the batteries B B B are included in the charging-circuit in multiple arc, and when the switches D D D are turned to contacts C' C' C' the series of secondary batteries are connected into the working-circuit (shown in dotted lines) in tension series. Any of the well-known switches may be employed instead of those shown.

Fig. 3 represents a windmill, W, arranged to operate the air-compressor Z, which compresses air into the expansible air-holder, from which it may be used to drive one or more distant motors O, which in turn propel the dynamo-machine.

Fig. 4 is an air-holder, with a valve-lever, Q, arranged to turn the air from the air-holder to the motor O automatically when the holder becomes filled to a given degree. Various ways of arranging automatic valves are obvious.

Figure 5:
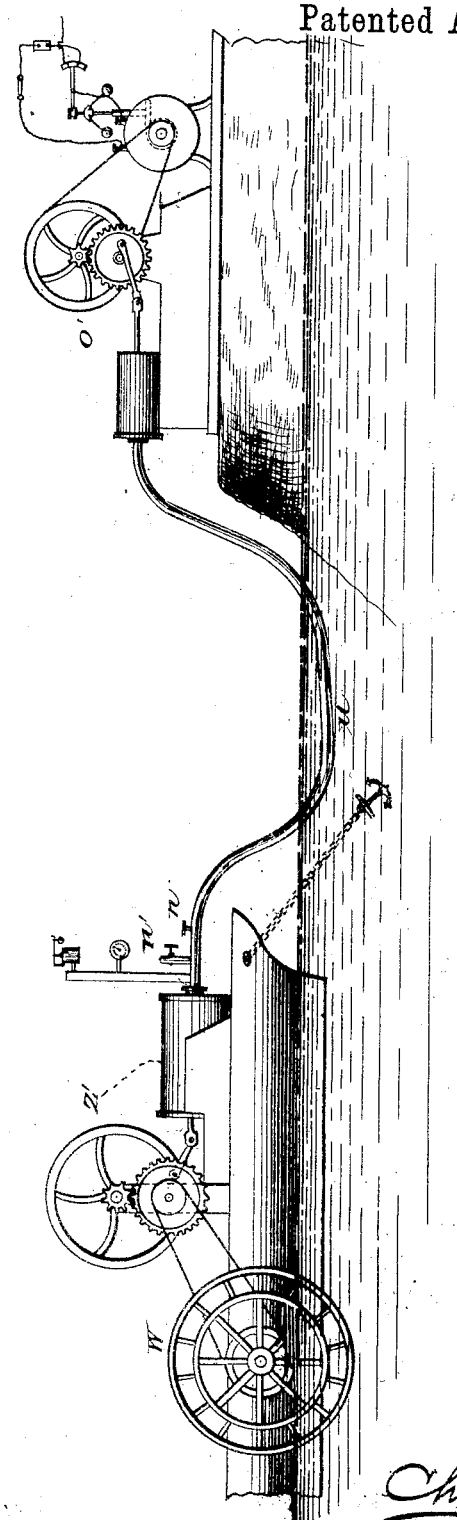

Fig. 5 represents a water-wheel, $w$, in a stream, driving an air-compressor, $Z'$, which operates the remote air-motor $O'$ through the pipe $u$ for propelling the dynamo-machine. The pipe $u$ can be charged to a high pressure in its normal condition, and the piston in the motor $O'$ be forced back by air sealed in front of it under pressure or a spring. The air-compressor $Z'$ can be got under momentum by closing valve $n$ and opening valve $n^2$ to give it idle motion for a few turns or strokes of its piston. Upon closing $n'$ and opening $n$ the piston of motor $O'$ will be actuated by a respiratory action of the air-compressor $Z'$. When the pipe $u$ is of considerable capacity the air-compressor may store air in it as an air-holder.

Figure 6:
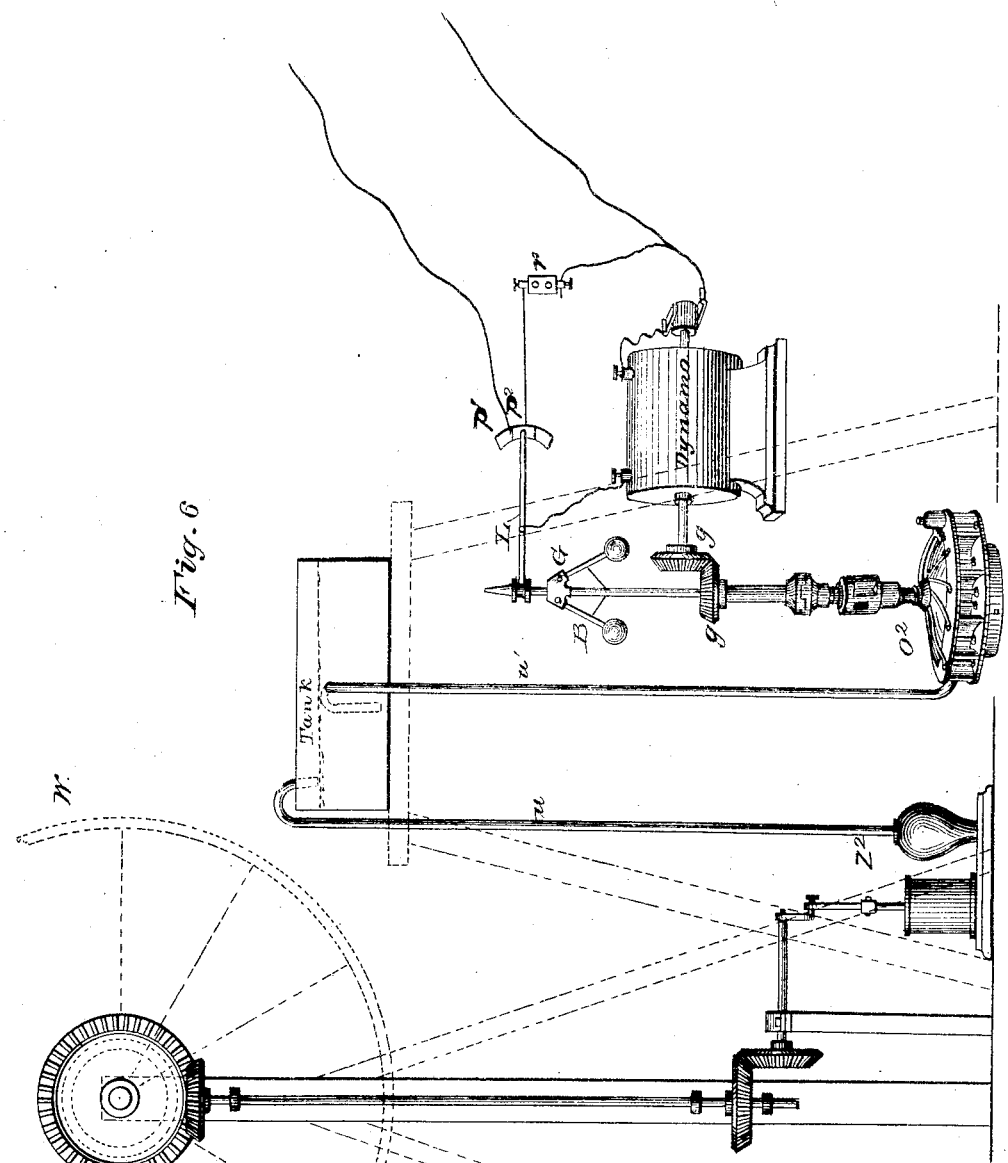

Fig. 6 shows the wind-wheel W, geared to the water-pump $Z^2$, and by its motion fills the tank through pipe $u$, or nearly so. When the water in the tank reaches a point above the curve in pipe $u'$, which penetrates through the tank to its interior, a siphon is formed, and the water is forced with great energy through the water-wheel $O^2$, which drives the dynamo-electric machine with good effect to charge secondary batteries, as described and shown. The beveled gears $g\ g$ can be varied so as to give the dynamo great speed. The ball-governor B G is shown upon the shaft of the water-wheel, disconnected from the dynamo, except through the wheels $g\ g$, and actuates the lever L to change the currents from a developing-circuit at $P^2$ to a charging-circuit at $P'$, as shown in Fig. 2.

Figure 7:
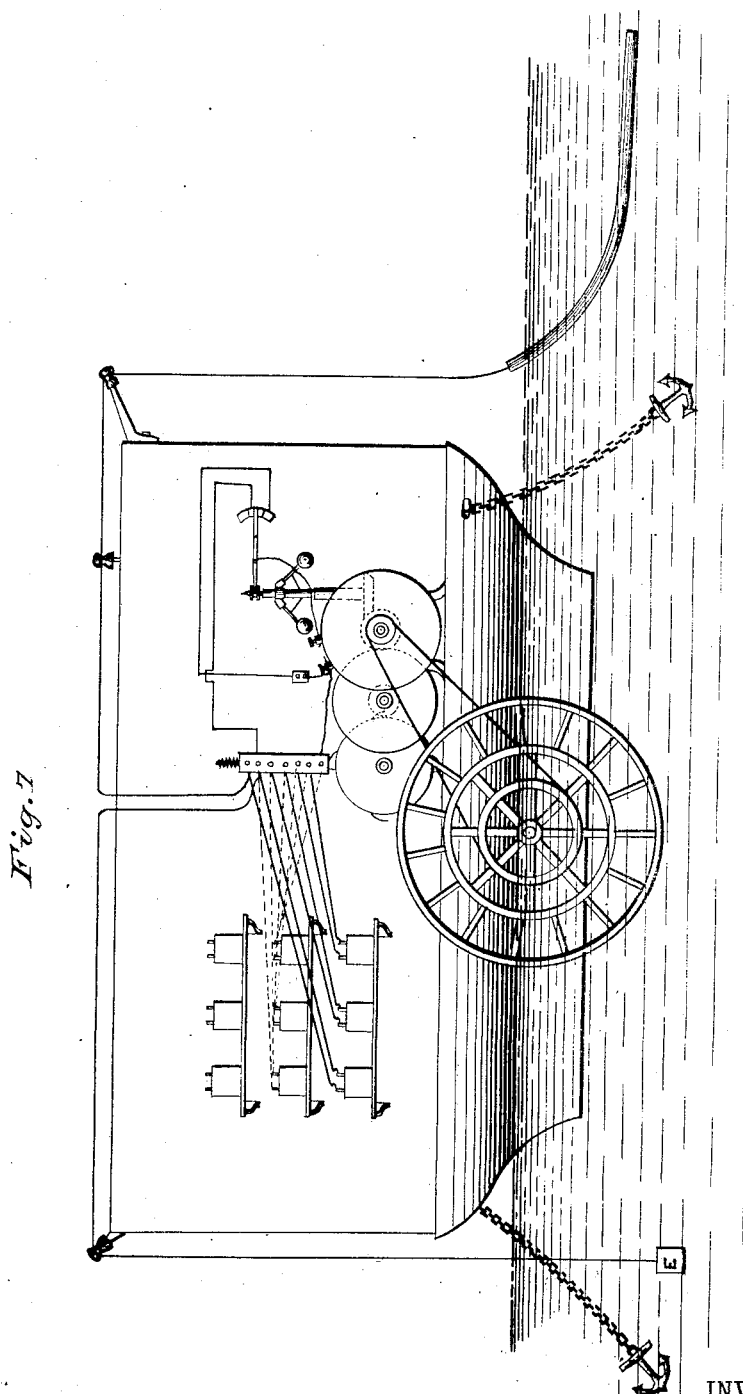

Fig. 7 represents a barge carrying a dynamo-machine with speeding-down mechanism, described in a previous application, for switching a series of secondary batteries out of the charging-circuit into a working, and a second series into the charging-circuit after a predetermined number of revolutions of the dynamo, with a ball-governor to leave the charging-circuit open when the speed of the dynamo-machine falls below a given velocity, and to place the dynamo charged into the charging-circuit, when a desired speed is attained. The initial power in this modification is a wheel actuated by incoming and outgoing tides, a constant motion being imparted in one direction by well-known mechanism for such uses. (Not shown.) Several wheels may be employed with one barge and their aggregate product in electricity be conveyed to shore over a cable insulated and submerged. Tide-wheels of various constructions have been extensively used for other purposes heretofore, and any of the well-known tide-wheels may be used in connection with my electrical storage apparatus.

It is obvious that in the employment of wind-wheels, tide-wheels, or wheels in streams, as shown, several wheels can be combined and grouped into one source of power to drive one or more dynamo-machines. Several wheels, each working separate pumps of approved construction, could furnish a good supply of water from which to run a wheel to propel a dynamo-machine. The wheels could be made smaller and a given power be obtained with less liability to breakage than if one very large wheel were used.

The wheels driven by wind can be placed upon house-tops, where horizontal wheels would be less objectionable on account of their better appearance. From such wheels, with an extra supply-battery, the house could be illuminated, light machinery propelled, bells operated, and clocks maintained.

When desired to apply the system to a portion of a city or town the wind-wheels or tide-wheels, located outside of the section to be lighted, can supply secondary batteries located at various remote points from the electrical generating-machine and its propelling-power, and where currents of quantity, with energy sufficient to charge secondary batteries, are conveyed over ordinary conductors, there is no risk to life or property by accidental contact with the wires, the currents of energy being confined to circuits not liable to come in contact with other conductors. The employment of quantity-currents of but sufficient energy to charge secondary batteries requires less expensive conductors and insulation, whether used on overhead lines or with conductors buried in the earth.

I do not confine myself to the forms of intermediate switches shown for connecting between an electrical generating-machine and secondary batteries to change the charging-circuit after a given charging of the secondary batteries has taken place.

What I claim is—

1. The combination of the following elements, namely: an electrical generating-machine, a developing-circuit, a charging-circuit, two series of secondary batteries, and a working or discharging circuit with devices, substantially as described, for placing said machine charged into the charging-circuit, with one or more of said secondary batteries, and for withdrawing said machine from said charging-circuit, and leaving the charging-circuit open, with circuit-controlling devices, substantially as described, made operative by the action of said machine to switch the charging-circuit from one of said series of secondary batteries and connect said charging-circuit with another of said series of secondary batteries after a predetermined flow of current from said generating-machine has taken place, with means, substantially as described, for placing the secondary batteries alternately in the charging-circuit, as described, and in the working-circuit in tension series, the whole operating in the manner and for the purpose set forth.

2. The combination, with the wind-wheel W, of the electrical generating-machine, the automatic switch L, adapted to act with the movement of the wind-wheel to open the charging-circuit V when the speed of the wind-mill falls below predetermined desired velocity, and switch devices for changing the charging-circuit after a given action of the machine has taken place.

3. The combination, with an electrical generating-machine, of the wind-wheel W, the pump $Z^2$, the pipe $u$, the reservoir or tank, the siphon $w'$, and the water-wheel $O^2$, the automatic switch devices, as described, with suitable circuits, and means, as shown, for charging secondary batteries, the whole operating in the manner and for the purpose set forth.

CHARLES E. BUELL.

Witnesses:
GEO. M. LOCKWOOD,
H. C. HUNTEMANN.